US012479693B2

(12) United States Patent
Nakano

(10) Patent No.: US 12,479,693 B2
(45) Date of Patent: Nov. 25, 2025

(54) ELEVATOR DEVICE

(71) Applicant: Mitsubishi Electric Corporation, Tokyo (JP)

(72) Inventor: Yusuke Nakano, Inazawa (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1367 days.

(21) Appl. No.: 17/256,665

(22) PCT Filed: Aug. 9, 2018

(86) PCT No.: PCT/JP2018/029931
§ 371 (c)(1),
(2) Date: Dec. 29, 2020

(87) PCT Pub. No.: WO2020/031331
PCT Pub. Date: Feb. 13, 2020

(65) Prior Publication Data

US 2021/0261381 A1 Aug. 26, 2021

(51) Int. Cl.
*B66B 1/34* (2006.01)
*B66B 1/28* (2006.01)
(Continued)

(52) U.S. Cl.
CPC .............. *B66B 1/3461* (2013.01); *B66B 1/28* (2013.01); *B66B 3/002* (2013.01); *B66B 19/007* (2013.01)

(58) Field of Classification Search
CPC ..... B66B 1/3461; B66B 1/3407; B66B 1/466; B66B 3/002
See application file for complete search history.

(56) References Cited

U.S. PATENT DOCUMENTS 5,257,176 A * 10/1993 Uetani .................. B66B 1/3407
700/83
5,616,894 A * 4/1997 Nieminen ............. B66B 5/0025
187/247
(Continued)

FOREIGN PATENT DOCUMENTS

JP 5-319710 A 12/1993
JP 2013-103786 A 5/2013
(Continued)

OTHER PUBLICATIONS

International Search Report and Written Opinion mailed on Oct. 9, 2018, received for PCT Application No. PCT/JP2018/029931, Filed on Aug. 9, 2018, 8 pages including English Translation.

*Primary Examiner* — Rina I Duda
(74) *Attorney, Agent, or Firm* — XSENSUS LLP

(57) ABSTRACT

Provided is an elevator device including a car operation panel installed inside a car of an elevator, and a plurality of landing operation panels installed each floor. The plurality of landing operation panels each include a landing-side transmission/reception device configured to transmit and receive information to and from the car operation panel. The car operation panel includes a reception device configured to receive car settings information and floor-by-floor settings information from an operation device inside the car, and a car-side transmission/reception device configured to transmit and receive information to and from the plurality of landing operation panels.

16 Claims, 3 Drawing Sheets

(51) Int. Cl.
*B66B 3/00* (2006.01)
*B66B 19/00* (2006.01)

(56) References Cited

U.S. PATENT DOCUMENTS

| | | | | | |
|---|---|---|---|---|---|
| 5,880,417 | A * | 3/1999 | Koh | B66B 1/3492 | 187/394 |
| 5,952,627 | A * | 9/1999 | Park | B66B 3/00 | 187/247 |
| 6,003,637 | A * | 12/1999 | Kim | B66B 1/34 | 187/391 |
| 6,481,531 | B1 * | 11/2002 | Nagura | B66B 1/467 | 187/247 |
| 7,172,055 | B2 * | 2/2007 | Engel | B66B 25/006 | 187/391 |
| 8,602,172 | B2 * | 12/2013 | Suzuki | B66B 1/2458 | 187/382 |
| 8,688,664 | B2 * | 4/2014 | Pineau | G06F 15/16 | 707/770 |
| 8,800,722 | B2 * | 8/2014 | Kodera | B66B 5/021 | 187/388 |

FOREIGN PATENT DOCUMENTS

| | | | |
|---|---|---|---|
| JP | 2016-172596 | A | 9/2016 |
| JP | 6210941 | B2 | 10/2017 |

* cited by examiner

ELEVATOR DEVICE

CROSS-REFERENCE TO RELATED APPLICATION

The present application is based on PCT filing PCT/JP2018/029931, filed Aug. 9, 2018, the entire contents of which are incorporated herein by reference.

TECHNICAL FIELD

The present invention relates to an elevator device including a car operation panel and a plurality of landing operation panels.

BACKGROUND ART

In a general elevator, a landing operation panel installed on each floor of a landing stores floor-by-floor settings information, which prescribes contents of control corresponding floor, in a memory of a landing control board of the landing operation panel. Examples of the floor-by-floor settings information to be stored in the memory of each landing control board include volume settings for announcement on the floor and enabled/disabled status settings of various functions.

Similarly, a car operation panel installed in a car of the elevator stores car settings information, which prescribes contents of control specific to the car, in a memory of a car control board. Examples of the contents indicated by the car settings information to be stored in the memory of the car control board include settings about on which floor the car is prohibited from landing, volume settings for announcement in the car, and enabled/disabled status settings of various functions.

There is known a related art in which a dedicated remote controller is used in order to facilitate the setting of the settings information to be stored in the memory of each landing control board and the memory of the car control board (see, for example, Patent Literature 1). In Patent Literature 1, improvement of operability felt by an operator, for example, an elevator driver, a building manager, or an elevator maintenance worker, is intended with the use of the remote controller.

CITATION LIST

Patent Literature

[PTL 1] JP 05-319710 A

SUMMARY OF INVENTION

Technical Problem

The related art, however, has a problem described below.

In Patent Literature 1, a remote-control reception device is provided in an in-car operation panel in order to improve operability on the car side. A remote control reception device is also provided in an operation panel on the elevator landing side in order to improve operability on the landing side at each landing.

The operability in the car and at each landing is improved by separately transmitting data to each remote control reception device with the use of a remote control transmission device. That is, workability is aimed to be improved by an operator's use of the remote control transmission device in individual setting work in the car and on every floor.

In Patent Literature 1, however, even with the use of remote control, the operator is required to perform individual setting work at each landing in order to store the individual, floor-by-floor settings information in the memory of the landing control board on each floor. Work for storing the individual, floor-by-floor settings information in the memory of the landing control board is accordingly still laborious despite the use of remote control. Workability improvement that facilitates the setting of the floor-by-floor settings information to be stored in the landing operation panel is therefore desired.

The present invention has been made to solve the problem described above, and has an object to provide an elevator device that can be improved more in workability in storing of floor-by-floor settings information in a landing operation panel.

Solution to Problem

According to one embodiment of the present invention, there is provided an elevator device including: a car operation panel which is installed inside a car of an elevator and is configured to control the car based on car settings information, the car settings information prescribing contents of control specific to the car; and a plurality of landing operation panels which are installed on each floor and control each floor based on floor-by-floor settings information, each of the floor-by-floor settings information prescribing contents of control corresponding the floor. The plurality of landing operation panels each include a landing-side transmission/reception device configured to transmit and receive information to and from the car operation panel. The car operation panel includes a reception device configured to receive the car settings information and the floor-by-floor settings information from an operation device inside the car, and a car-side transmission/reception device configured to transmit and receive the information to and from the plurality of landing operation panels. The car operation panel is configured to transmit, when receiving the floor-by-floor settings information from the operation device via the reception device, the floor-by-floor settings information via the car-side transmission/reception device to one of the plurality of landing operation panels that is communicable to and from the car operation panel.

Advantageous Effects of Invention

According to the present invention, the elevator device that can be improved more in workability in the storing of the settings information in the landing operation panel can be obtained.

DESCRIPTION OF EMBODIMENTS

Preferred embodiments of an elevator device according to the present invention are described below with reference to the drawings.

First Embodiment

Figure 1:
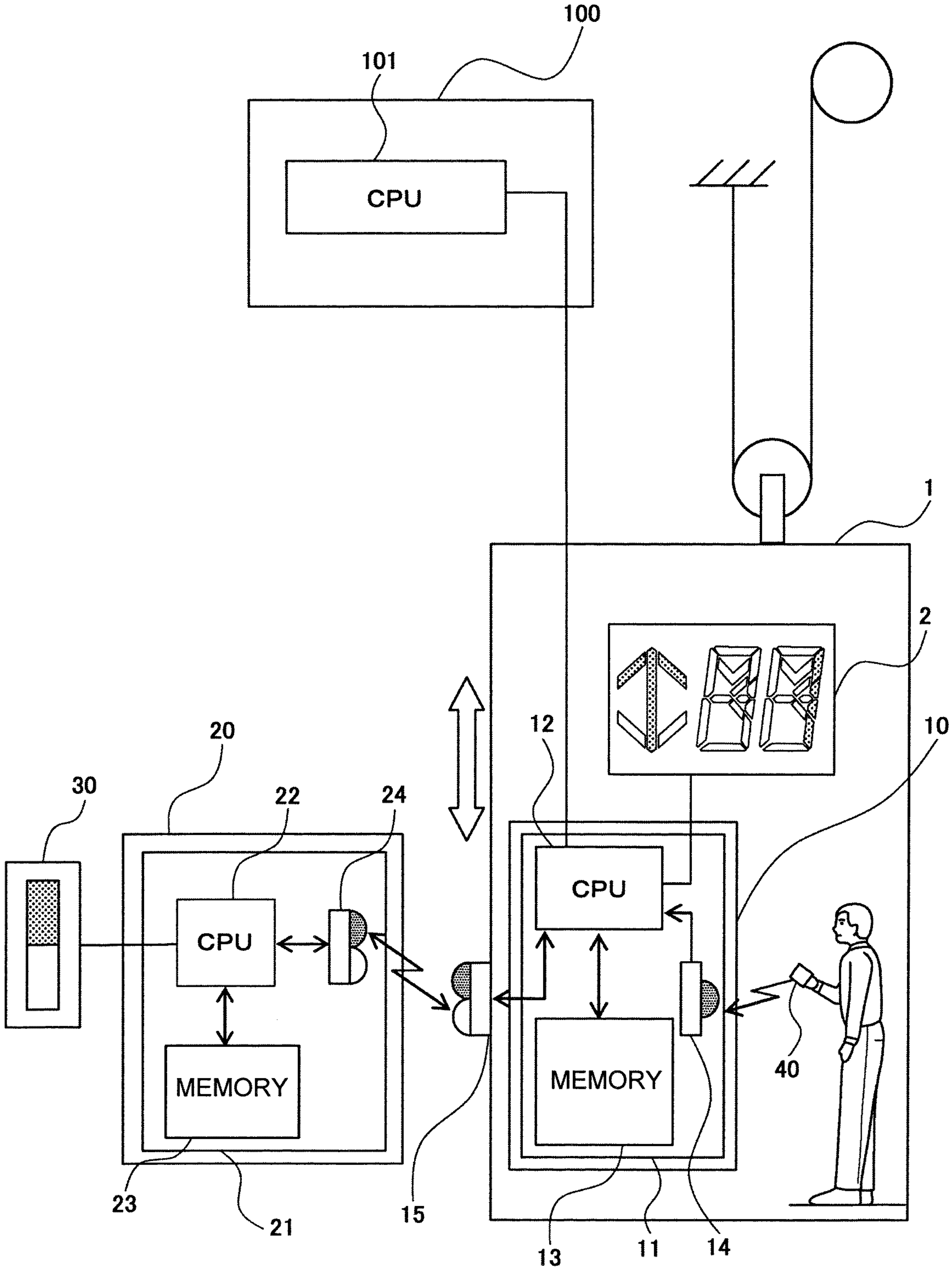
FIG. 1 is an overall configuration diagram of an elevator device according to a first embodiment of the present invention.

FIG. 1 is an overall configuration diagram of an elevator device according to a first embodiment of the present invention. In the overall configuration diagram of FIG. 1, components are roughly divided by location into three groups: components of a car 1 in which a car operation panel 10 is installed, components of a landing operation panel 20, and components of an elevator control device 100. The landing operation panel 20 is provided on each floor. In FIG. 1, however, the landing operation panel 20 on one floor is illustrated as a representative.

Configurations on the elevator control device 100 side and the car 1 side are described first. The car 1 is provided with an indicator 2 and a car operation panel 10. The car operation panel 10 is provided with: a car control board 11 including a CPU 12, a memory 13, and a reception device 14; and a car-side transmission/reception device 15. The car-side transmission/reception device 15, which is one of the components of the car operation panel 10, is installed outside the car 1 in FIG. 1. However, the installation place of the car-side transmission/reception device 15 is not limited thereto as long as transmission to and reception from a landing-side transmission/reception device 24 described later are possible.

The indicator 2 functions as a notification device configured to notify a moving direction of the car 1 and a floor corresponding to the current position of the car 1.

The car-side transmission/reception device 15 functions as a transmitter/receiver configured to transmit a signal to the landing operation panel 20 and receive a signal from the landing operation panel 20.

The CPU 12 provided in the car control board 11 is a controller configured to control the car 1 based on car settings information, which prescribes contents of control specific to the car, and specifically has functions described below. The CPU 12 is configured to transmit and receive a signal to and from a CPU 101 in the elevator control device 100. The CPU 12 is also configured to receive, via the reception device 14, a transmission signal from an operation device 40 held by an operator. A special remote controller, a portable terminal in which special software is installed, and the like can be used as the operation device 40.

The CPU 12 is configured to transmit and receive a signal to and from the landing operation panel 20 via the car-side transmission/reception device 15. The CPU 12 is also configured to write the car settings information to the memory 13 and read the car settings information out of the memory 13. The CPU 12 is further configured to control the car 1 based on the read car settings information. The CPU 12 is configured to notify required information via the indicator 2 as well.

A configuration on the landing side is described next. The landing operation panel 20 separately installed at the landing of each floor is provided with a landing control board 21. A CPU 22, a memory 23, and the landing-side transmission/reception device 24 are provided in the landing control board 21.

The CPU 22 provided in the landing control board 21 is a controller configured to perform control at each landing based on floor-by-floor settings information, which prescribes contents of control specific to each floor, and specifically has functions described below. The CPU 22 is configured to transmit and receive, via the landing-side transmission/reception device 24, a signal to and from the car-side transmission/reception device 15 provided on the car side. The CPU 22 is also configured to write the floor-by-floor settings information to the memory 23 and read the floor-by-floor settings information out of the memory 23. The CPU 22 is further configured to perform control at each landing based on the read floor-by-floor settings information. The CPU 22 is configured to notify required information as well by controlling display of a hall lantern 30, which is installed at the landing of each floor.

The thus configured elevator device according to the first embodiment enables the operator to store the car settings information in the memory 13 of the car control board 11 by operating the operation device 40 inside the car 1. The elevator device according to the first embodiment also enables the operator to store the individual, floor-by-floor settings information in the memory 23 of the landing control board 21 on each floor by operating the operation device 40 inside the car 1. Specific steps thereof are described in detail below. Wireless communication using radio waves, infrared communication using an infrared ray, and other types of communication are employable for communication between the operation device 40 and the reception device 14, and communication between the car-side transmission/reception device 15 and the landing-side transmission/reception device 24.

<Case 1> Steps of storing the car settings information in the memory 13 of the car control board 11 by using the operation device 40 inside the car 1

First, inside the car 1, the operator sets the car settings information to be stored in the memory 13 of the car control board 11, with the use of the operation device 40. The operator then transmits the set car settings information from the operation device 40 to the reception device 14.

The CPU 12 stores the car settings information received via the reception device 14 in the memory 13. Through this series of processing steps, the operator can easily set the car settings information in the memory 13 of the car control board 11 by using the operation device 40 inside the car 1. This series of processing steps is executable irrespective of the position of the car 1.

<Case 2> Steps of storing the floor-by-floor settings information in the memory 23 of the landing control board 21 by using the operation device 40 inside the car 1

In order to execute the processing of Case 2, the floor-by-floor settings information set with the operation device 40 is required to be transmitted to the landing-side transmission/reception device 24 on a target floor from the car-side transmission/reception device 15. There are limitations in this case to a distance and a range over which the car-side transmission/reception device 15 and the landing-side transmission/reception device 24 can hold communication. The car 1 is accordingly required to be moved to a place in which the landing-side transmission/reception device 24 on the target floor is installed.

However, it is difficult for the operator inside the car 1 to visually recognize the position of the landing-side transmission/reception device 24 on the target floor from inside the car 1. In the first embodiment, this is addressed by executing a landing search mode in which the car 1 is moved so as to bring the car-side transmission/reception device 15 and the landing-side transmission/reception device 24 on the target floor into a state in which communication is possible, before the processing of Case 2 is executed.

First, the operator inside the car 1 uses the operation device 40 to set the landing search mode. During the execution of the landing search mode, the operator looks at floor information displayed on the indicator 2 and simultaneously operates one of an up button or a down button, the up button and the down button being provided in the operation device 40. The car 1 can thus be moved in a direction in which the target landing control board 21 is installed.

That is, when the CPU 12 receives via the reception device 14 a notification that the landing search mode has been set, transmits a moving command in response to the press of one of the up button or the down button to the CPU 101 in the elevator control device 100, which is configured to perform overall control of the elevator. This enables the CPU 12 to move the car 1. When the car 1 is moving, the CPU 12 further transmits, via the car-side transmission/reception device 15, a landing search mode signal indicating that the car 1 is moving during the landing search mode.

Out of CPUs that are each the CPU 22 of the landing control board 21 provided on one of the floors, one CPU 22 that has successfully received the landing search mode signal via the landing-side transmission/reception device 24 returns a search completion signal informing of successful reception of the landing search mode signal to the car-side transmission/reception device 15 via the landing-side transmission/reception device 24.

When receiving the search completion signal, the CPU 12 notifies the operator via the indicator 2 that the car 1 has successfully been moved so as to bring the car-side transmission/reception device 15 and the landing-side transmission/reception device 24 into a state in which communication is possible. The operator stops the operation of moving the car 1 based on this notified result.

Through the execution of those steps, the operator checks the indicator 2 and simultaneously operates the operation device 40 inside the car 1 in the landing search mode, to thereby easily move the car 1 to the position of the target landing operation panel 20. The operator then uses the operation device 40 inside the car 1 in a manner described below to store the floor-by-floor settings information in the memory 23 of the landing control board 21.

First, the operator uses the operation device 40 inside the car 1 to set the floor-by-floor settings information to be stored in the memory 23 of the target landing control board 21. The operator then transmits the set floor-by-floor settings information from the operation device 40 to the reception device 14.

The CPU 12 receives the floor-by-floor settings information via the reception device 14 and transmits the floor-by-floor settings information via the car-side transmission/reception device 15. Meanwhile, the CPU 22 of the target landing control board 21 receives, via the landing-side transmission/reception device 24, the floor-by-floor settings information set with the operation device 40. The CPU 22 stores the received floor-by-floor settings information in the memory 23.

This series of processing steps is executed for every landing control board 21, and the repeated execution of the series of processing steps enables the operator to easily set the floor-by-floor settings information to the memory 23 of each landing control board 21 by using the operation device 40 inside the car 1.

As described above, according to the first embodiment, the first embodiment has a configuration that enables the landing control board provided on each floor and the car control board provided in the car to hold data communication. The first embodiment also has a configuration in which the current position of the car is transmitted from the elevator control device as floor information and can be displayed on the indicator. Those configurations enable the operator to move the car to a target position and easily store the floor-by-floor settings information in the memory of each landing control board by operating the operation device inside the car. As a result, the elevator device with which more improved workability and the shortening of work time can be aimed for can be achieved.

The landing operation panel does not include an indicator in some cases. In such cases, the floor information cannot be displayed in an answerback style when the car is moved with the use of the operation device. Accordingly, the result of moving the car with the operation device cannot be checked. In the first embodiment, on the other hand, the elevator device can easily display in an answerback style by utilizing the indicator that is included inside the car as standard, as well as being capable of the execution of operation with the use of the operation device inside the car. As a result, the elevator device with which more improved workability and the shortening of work time can be aimed for can be achieved.

In the first embodiment, a configuration in which an indicator is used as a notification device and feedback is displayed by the indicator is described. However, the same effect can be obtained also by using a speaker from which audio is output as a notification device instead of an indicator, and providing feedback through audio output instead of displaying in an answerback style.

Second Embodiment

In the preceding first embodiment, the configuration with which operability in initial setting of the floor-by-floor settings information to the memory of the landing control board on each floor can be improved is described. In a second embodiment of the present invention, steps are described that are for improving recovery work by utilizing this configuration of the first embodiment to easily set anew previously set settings information to a replacement control board when one control board out of the car control board and the plurality of landing control boards is replaced.

According to the configuration of the preceding first embodiment that is illustrated in FIG. 1, the CPU 12 of the car control board 11 and the CPU 22 of each landing control board 21 have a communication function with which data can be transmitted and received. Further, the car control board 11 includes the memory 13 for storing its own car settings information, and each landing control board 21 includes the memory 23 for storing its own floor-by-floor settings information.

Backup data can accordingly be kept by storing, in the memory 13 of the car control board 11, the floor-by-floor settings information stored in the memory 23 of each landing control board 21. The floor-by-floor settings information of the landing control board 21 that is required to be replaced can easily be set anew by executing this backup function. That is, the CPU 12 can easily set anew the floor-by-floor settings information that is stored in the memory 13 in association with the landing control board 21 to be replaced, by transmitting, with the use of the communication function, the stored floor-by-floor settings information to the memory 23 of the replacement landing control board 21.

Backup data of the car settings information can be kept as well by storing, in the memory 23 of the landing control board 21 in the landing operation panel that is a storage destination, the car settings information stored in the memory 13 of the car control board 11. The car settings information of the car control board 11 required to be replaced can easily be set anew by executing this backup function. That is, the CPU 22 can easily set anew the car settings information of the car control board 11 to be replaced, by transmitting, with the use of the communication function, the car settings information that is stored in the memory 23 of the landing control board 21 in the storage destination landing operation panel in association with the car control board 11 to be replaced, to the memory 13 of the replacement car control board 11.

Figure 2:
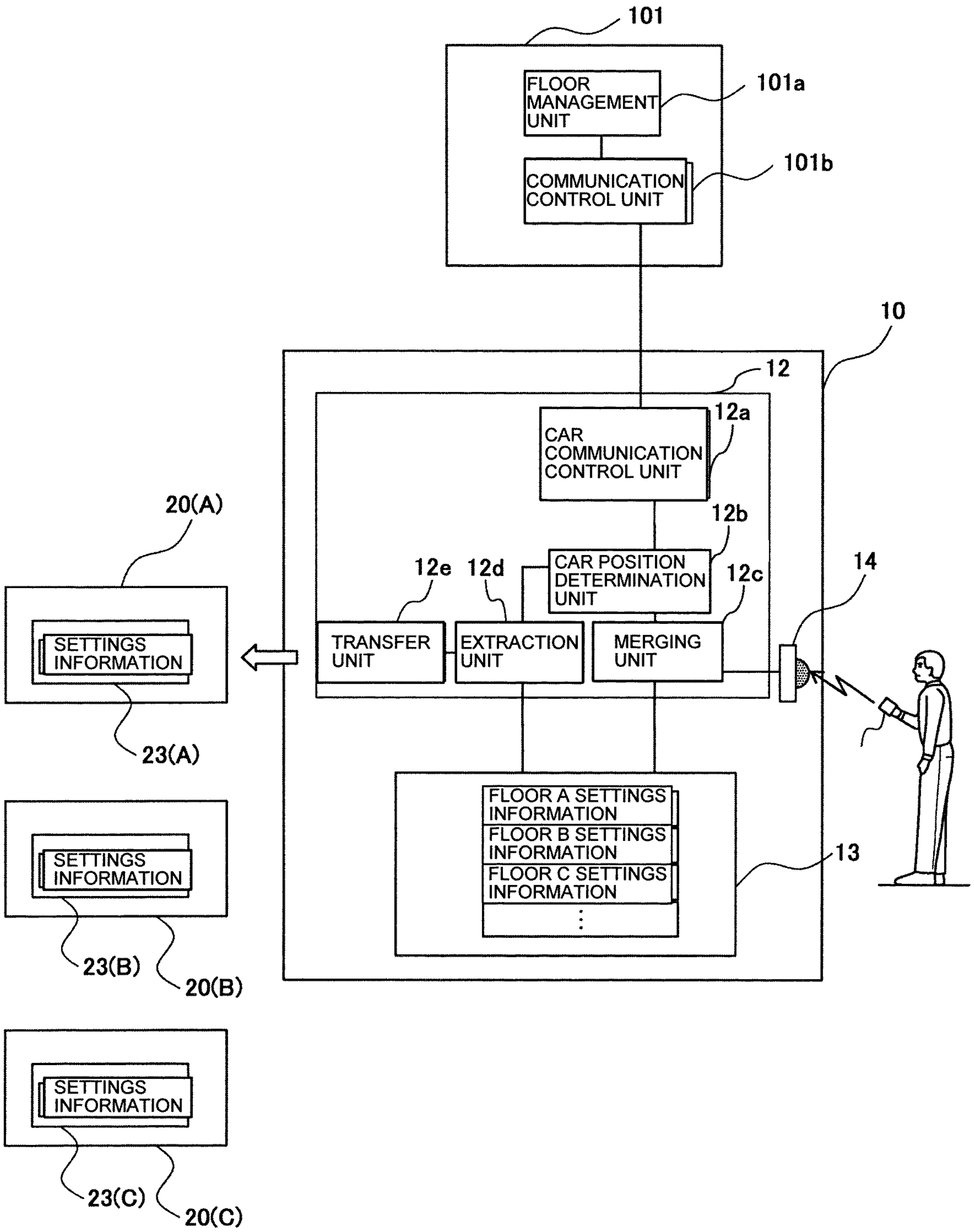
FIG. 2 is a block diagram for illustrating a function configuration of an elevator device according to a second embodiment of the present invention.

The backup function for backing up the settings information and the set-anew function for setting anew the settings information are described in detail with reference to FIG. 2. FIG. 2 is a block diagram for illustrating a function configuration of an elevator device according to the second embodiment of the present invention. In FIG. 2, function configurations of the CPU 101 and the CPU 12 in FIG. 1 described above are illustrated as well as the details of data to be stored in the memory 13 and the memory 23.

In FIG. 2, the landing operation panels of three floors, namely, a landing operation panel 20(A) on Floor A, a landing operation panel 20(B) on Floor B, and a landing operation panel 20(C) on Floor C, are illustrated as specific examples of the landing operation panel 20 provided on each floor. A case of setting anew the floor-by-floor settings information to a memory 23(A) when the landing control board 21 provided in the landing operation panel 20(A) on Floor A is replaced is also illustrated in FIG. 2 as an example.

The CPU 101 in FIG. 2 includes function blocks that are a floor management unit 101*a* configured to manage the floor information of the car 1 and a communication control unit 101*b* configured to transmit the floor information to the CPU 12.

The CPU 12 includes function blocks that are a car communication control unit 12*a*, a car position determination unit 12*b*, a merging unit 12*c*, an extraction unit 12*d*, and a transfer unit 12*e*. The car communication control unit 12*a* is configured to receive the floor information from the CPU 101. The car position determination unit 12*b* is configured to determine the position of the car based on the floor information.

The merging unit 12*c* is configured to merge the position of the car 1 that is determined by the car position determination unit 12*b* and the floor-by-floor settings information transmitted from the operation device 40 to create a settings information table, which associates, for each landing, a floor and the floor-by-floor settings information, and store the settings information table in the memory 13. The extraction unit 12*d* is configured to extract the floor-by-floor settings information of a floor that requires to be set anew from the settings information table stored in the memory 13. The transfer unit 12*e* is configured to transfer, via the car-side transmission/reception device 15, the floor-by-floor settings information extracted by the extraction unit 12*d*.

Steps of storing the floor-by-floor settings information of Floor A in the settings information table in the memory 13 in this configuration are described first. The operator follows the processing in the landing search mode described in the preceding first embodiment to move the car 1 to Floor A with the use of the operation device 40. In this step, the car communication control unit 12*a* receives the floor information of the car 1 from the communication control unit 101*b*.

The car position determination unit 12*b* determines that the position of the car 1 is "Floor A" based on the floor information received via the car communication control unit 12*a*. The merging unit 12*c* merges "Floor A" indicating the position of the car 1 that has been determined by the car position determination unit 12*b* and the floor-by-floor settings information of Floor A transmitted from the operation device 40 to update the settings information table with the floor-by-floor settings information that is associated with Floor A as "Floor A settings information". The merging unit 12*c* stores updated settings information table in the memory 13.

This processing is executed for Floor B and Floor C as well, to thereby store the settings information table that includes "Floor A settings information", "Floor B settings information", and "Floor C settings information" in the memory 13. That is, the CPU 12 can execute the backup function for backing up the settings information by creating the settings information table when the floor-by-floor settings information described in the preceding first embodiment is set to each landing control board 21.

Further, the execution of the backup function described above enables the operator to create the settings information table without using the operation device 40 to specify the floor information about a floor on which the car 1 is stopped. The elimination of a mistake in setting the floor information is accordingly accomplished, as well as the simplification of operation.

Description is given next of steps to be executed when a landing control board 21(A) installed on Floor A is replaced to set anew the floor-by-floor settings information to the memory 23(A) of the replacement landing control board 21(A) with the use of the created settings information table.

The operator follows the processing in the landing search mode described in the preceding first embodiment to move the car 1 to Floor A with the use of the operation device 40. In this step, the car communication control unit 12*a* receives the floor information of the car 1 from the communication control unit 101*b*. The car position determination unit 12*b* determines that the position of the car 1 is "Floor A" based on the floor information received via the car communication control unit 12*a*.

Meanwhile, the operator uses the operation device 40 to input a set-anew command indicating that the floor-by-floor settings information is to be set anew to the landing control board 21(A) on Floor A. When the extraction unit 12*d* in the CPU 12 receives the set-anew command, the extraction unit 12*d* extracts the "Floor A settings information" from the settings information table in the memory 13.

The transfer unit 12*e* transfers, via the car-side transmission/reception device 15, the "Floor A settings information" extracted by the extraction unit 12*d*. A CPU 22(A) in the landing control board 21(A) can consequently store the floor-by-floor settings information that is prescribed by the "Floor A settings information" in the memory 23(A). The CPU 12 can accordingly set anew, to the replacement landing control board 21(A), the floor-by-floor settings information that has been set to the landing control board 21(A) to be replaced, and the recovery work can thus be facilitated.

Further, the execution of the set-anew function described above enables the operator to set anew the floor-by-floor settings information without using the operation device 40 to specify the floor information about a floor on which the car 1 is stopped. The elimination of a mistake in setting the floor information is accordingly accomplished, as well as the simplification of operation.

As described above, according to the second embodiment, the second embodiment has the communication function that enables the landing control board provided on each floor and the car control board provided in the car to hold data communication. The second embodiment also has the backup function with which the floor-by-floor settings information of every landing control board is stored as the settings information table in the memory in the car control board. With those functions, when the landing control board is replaced, the floor-by-floor settings information prior to the replacement can easily be set anew, which can facilitate the execution of the recovery work. The elevator device that can be improved more in workability can be accomplished as a result.

The second embodiment also has the backup function with which the car settings information of the car control board is stored as the settings information table in the memory in at least one landing control board. With this function, when the car control board is replaced, the car settings information prior to the replacement can easily be set anew, which can facilitate the execution of the recovery work. The elevator device that can be improved more in workability can be accomplished as a result.

Figure 3:
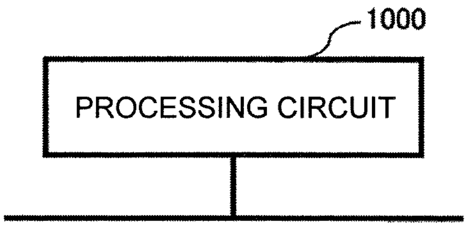
FIG. 3 is a configuration diagram for illustrating a case of implementing functions of the elevator device according to the first and second embodiments of the present invention with a processing circuit that is a dedicated piece of hardware.
Figure 4:
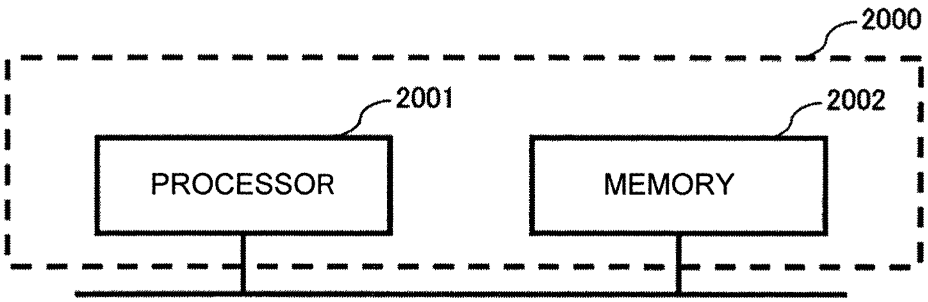
FIG. 4 is a configuration diagram for illustrating a case of implementing the functions of the elevator device according to the first and second embodiments of the present invention with a processing circuit that includes a processor and a memory.

The functions of the car operation panel 10, the landing operation panel 20, and the elevator control device 100, which are included in each of the elevator devices according to the first and second embodiments described above, are implemented by a processing circuit. The processing circuit for implementing each of the functions may be dedicated hardware, or a processor configured to execute a program stored in a memory. FIG. 3 is a configuration diagram for illustrating a case of implementing the functions of the elevator device according to the first and second embodiments of the present invention with a processing circuit 1000 that is a dedicated piece of hardware. FIG. 4 is a configuration diagram for illustrating a case of implementing the functions of the elevator device according to the first and second embodiments of the present invention with a processing circuit 2000 that includes a processor 2001 and a memory 2002.

When the processing circuit is dedicated hardware, the processing circuit 1000 corresponds to, for example, a single circuit, a composite circuit, a programmed processor, a parallel-programmed processor, an application specific integrated circuit (ASIC), a field programmable gate array (FPGA), or a combination thereof. The functions of the respective units may each be implemented by the individual processing circuit 1000, or may be implemented together by one processing circuit 1000.

Meanwhile, when the processing circuit is the processor 2001, the functions of the respective units are implemented by software, firmware, or a combination of software and firmware. The software and the firmware are coded as a program and stored in the memory 2002. The processor 2001 reads and executes the program stored in the memory 2002, to thereby implement the function of each of the units. That is, the elevator device includes the memory 2002 configured to store programs the execution of which by the processing circuit 2000 ultimately leads to the implementation of the functions of the respective units of the car operation panel 10, the landing operation panel 20, and the elevator control device 100.

It is also understood that those programs cause a computer to execute the steps and methods described above for the respective units. In this case, the memory 2002 corresponds to, for example, a random access memory (RAN), a read only memory (ROM), a flash memory, an erasable programmable read only memory (EPROM), an electrically erasable and programmable read only memory (EEPROM), or other such non-volatile or volatile semiconductor memory. The memory 2002 also corresponds to, for example, a magnetic disk, a flexible disk, an optical disc, a compact disc, a MiniDisk, or a DVD.

Some of the respective functions of the respective units described above may be implemented by dedicated hardware, and others thereof may be implemented by software or firmware.

In this manner, the processing circuit can implement the function of each of the units described above by hardware, software, firmware, or a combination thereof.

REFERENCE SIGNS LIST

1 car, 2 indicator (notification device), 10 car operation panel, 11 car control board, 12 CPU, 12*a* car communication control unit, 12*b* car position determination unit, 12*c* merging unit, 12*d* extraction unit, 12*e* transfer unit, 13 memory, 14 reception device, 15 car-side transmission/reception device, 20 landing operation panel, 21 landing control board, 22 CPU, 23 memory, 24 landing-side transmission/reception device, 30 hall lantern, 40 operation device, 100 elevator control device, 101*a* floor management unit, 101*b* communication control unit

The invention claimed is:

1. An elevator device, comprising:

a car operation panel which is installed inside a car of an elevator, and is configured to control the car based on car settings information, the car settings information prescribing contents of control specific to the car; and a plurality of landing operation panels which are installed on each floor and control each floor based on floor-by-floor settings information, each of the floor-by-floor settings information prescribing contents of control corresponding to the floor, wherein the plurality of landing operation panels each include a landing-side transmission/reception device configured to transmit and receive information to and from the car operation panel, wherein the car operation panel includes a reception device configured to receive the car settings information and the floor-by-floor settings information from an operation device inside the car, and a car-side transmission/reception device configured to transmit and receive the information to and from the plurality of landing operation panels, and wherein the car operation panel is configured to transmit, when receiving the floor-by-floor settings information from the operation device via the reception device, the floor-by-floor settings information via the car-side transmission/reception device to one of the plurality of landing operation panels that is communicable to and from the car operation panel.

2. The elevator device according to claim 1, wherein the car operation panel is configured to:

store, by transmitting the car settings information via the car-side transmission/reception device to a storage destination landing operation panel which is one of the plurality of landing operation panels, the car settings information in the storage destination landing operation panel; and receive, when the car settings information is stored in a memory included in a car control board and the car control board is to be replaced, the car settings information via the car-side transmission/reception device from the storage destination landing operation panel, and store the received car settings information in a memory of a replacement car control board.

3. The elevator device according to claim 1, wherein the car operation panel is configured to:

create, when receiving the floor-by-floor settings information via the reception device from the operation device, a settings information table which associates, for each floor, the floor-by-floor settings information with the floor, and store the created settings information table in the memory in which the car settings information is stored; and extract, when the floor-by-floor settings information is stored in a memory included in a landing control board in one of the plurality of landing operation panels, and the landing control board is to be replaced, floor-by-floor settings information corresponding a landing operation panel including a replacement landing control board from the settings information table, and transmit the extracted floor-by-floor settings information via the car-side transmission/reception device to the landing operation panel including the replacement landing control board.

4. The elevator device according to claim 3, wherein the car operation panel is configured to receive, when creating the settings information table, floor information corresponding to a current position of the car from an elevator control device configured to perform overall control of the elevator, and associate the received floor information as each floor with the floor-by-floor settings information.

5. The elevator device according to claim 1, further comprising a notification device which is installed inside the car, and is configured to notify a floor corresponding to a current position of the car and notify that the car-side transmission/reception device and the landing-side transmission/reception device are in a state in which communication is possible, wherein the car operation panel is configured to:

receive, when the state in which communication is possible is not reached at the current position of the car, a moving command for moving the car from the operation device via the reception device, and execute a landing search mode in which the car is moved so that the state in which communication is possible is reached based on the received moving command; and notify, when the car reaches the state in which communication is possible as a result of moving the car during the execution of the landing search mode, that the state in which communication is possible is reached via the notification device.

6. The elevator device according to claim 2, wherein the car operation panel is configured to:

create, when receiving the floor-by-floor settings information via the reception device from the operation device, a settings information table which associates, for each floor, the floor-by-floor settings information with the floor, and store the created settings information table in the memory in which the car settings information is stored; and extract, when the floor-by-floor settings information is stored in a memory included in a landing control board in one of the plurality of landing operation panels, and the landing control board is to be replaced, floor-by-floor settings information corresponding a landing operation panel including a replacement landing control board from the settings information table, and transmit the extracted floor-by-floor settings information via the car-side transmission/reception device to the landing operation panel including the replacement landing control board.

7. The elevator device according to claim 6, wherein the car operation panel is configured to receive, when creating the settings information table, floor information corresponding to a current position of the car from an elevator control device configured to perform overall control of the elevator, and associate the received floor information as each floor with the floor-by-floor settings information.

8. The elevator device according to claim 2, further comprising a notification device which is installed inside the car, and is configured to notify a floor corresponding to a current position of the car and notify that the car-side transmission/reception device and the landing-side transmission/reception device are in a state in which communication is possible, wherein the car operation panel is configured to:

receive, when the state in which communication is possible is not reached at the current position of the car, a moving command for moving the car from the operation device via the reception device, and execute a landing search mode in which the car is moved so that the state in which communication is possible is reached based on the received moving command; and notify, when the car reaches the state in which communication is possible as a result of moving the car during the execution of the landing search mode, that the state in which communication is possible is reached via the notification device.

9. The elevator device according to claim 3, further comprising a notification device which is installed inside the car, and is configured to notify a floor corresponding to a current position of the car and notify that the car-side transmission/reception device and the landing-side transmission/reception device are in a state in which communication is possible, wherein the car operation panel is configured to:

receive, when the state in which communication is possible is not reached at the current position of the car, a moving command for moving the car from the operation device via the reception device, and execute a landing search mode in which the car is moved so that the state in which communication is possible is reached based on the received moving command; and notify, when the car reaches the state in which communication is possible as a result of moving the car during the execution of the landing search mode, that the state in which communication is possible is reached via the notification device.

10. The elevator device according to claim 4, further comprising a notification device which is installed inside the car, and is configured to notify a floor corresponding to a current position of the car and notify that the car-side transmission/reception device and the landing-side transmission/reception device are in a state in which communication is possible, wherein the car operation panel is configured to:

receive, when the state in which communication is possible is not reached at the current position of the car, a moving command for moving the car from the operation device via the reception device, and execute a landing search mode in which the car is moved so that the state in which communication is possible is reached based on the received moving command; and notify, when the car reaches the state in which communication is possible as a result of moving the car during the execution of the landing search mode, that the state in which communication is possible is reached via the notification device.

11. The elevator device according to claim 6, further comprising a notification device which is installed inside the car, and is configured to notify a floor corresponding to a current position of the car and notify that the car-side transmission/reception device and the landing-side transmission/reception device are in a state in which communication is possible, wherein the car operation panel is configured to:

receive, when the state in which communication is possible is not reached at the current position of the car, a moving command for moving the car from the operation device via the reception device, and execute a landing search mode in which the car is moved so that the state in which communication is possible is reached based on the received moving command; and notify, when the car reaches the state in which communication is possible as a result of moving the car during the execution of the landing search mode, that the state in which communication is possible is reached via the notification device.

12. The elevator device according to claim 7, further comprising a notification device which is installed inside the car, and is configured to notify a floor corresponding to a current position of the car and notify that the car-side transmission/reception device and the landing-side transmission/reception device are in a state in which communication is possible, wherein the car operation panel is configured to:

receive, when the state in which communication is possible is not reached at the current position of the car, a moving command for moving the car from the operation device via the reception device, and execute a landing search mode in which the car is moved so that the state in which communication is possible is reached based on the received moving command; and notify, when the car reaches the state in which communication is possible as a result of moving the car during the execution of the landing search mode, that the state in which communication is possible is reached via the notification device.

13. The elevator device according to claim 1, wherein the floor-by-floor settings information includes a volume setting for an announcement to be made on the corresponding floor.

14. The elevator device according to claim 1, wherein the car settings information includes a volume setting for an announcement to be made inside the car.

15. The elevator device according to claim 1, wherein the operation device is held by an operator.

16. The elevator device according to claim 1, wherein the car operation panel is configured to transmit, when receiving the floor-by-floor settings information from the operation device via the reception device, the floor-by-floor settings information via the car-side transmission/reception device to each of the plurality of landing operation panels that is communicable to and from the car operation panel.

* * * * *